United States Patent
Negishi et al.

(10) Patent No.: US 7,510,604 B2
(45) Date of Patent: Mar. 31, 2009

(54) CYAN INK FOR INK JET AND INK JET RECORDING METHOD

(75) Inventors: Yuuko Negishi, Tokyo (JP); Hiroshi Tomioka, Tokyo (JP); Hiroyuki Takuhara, Tokyo (JP); Hideki Yamakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 11/648,594

(22) Filed: Jan. 3, 2007

(65) Prior Publication Data
US 2007/0107627 A1 May 17, 2007

Related U.S. Application Data

(63) Continuation of application No. PCT/JP2006/314008, filed on Jul. 7, 2006.

(30) Foreign Application Priority Data

Jul. 8, 2005 (JP) .............................. 2005-199807

(51) Int. Cl.
C09D 11/02 (2006.01)
(52) U.S. Cl. ................ 106/31.47; 106/31.49; 106/31.5; 106/31.58
(58) Field of Classification Search .............. 106/31.27, 106/31.47, 31.49, 31.5, 31.58; 347/100
See application file for complete search history.

(56) References Cited

U.S. PATENT DOCUMENTS

| 7,208,033 | B2 * | 4/2007 | Kawabe et al. ........... 106/31.49 |
| 7,241,332 | B2 * | 7/2007 | Yoshizawa et al. ....... 106/31.47 |
| 7,244,299 | B2 * | 7/2007 | Tsuji et al. ................ 106/31.47 |
| 7,282,090 | B2 * | 10/2007 | Osumi et al. ............. 106/31.47 |
| 2006/0119683 | A1 * | 6/2006 | Yoshizawa et al. .......... 347/100 |
| 2006/0139429 | A1 * | 6/2006 | Osumi et al. ................ 106/31.5 |
| 2007/0109371 | A1 | 5/2007 | Tomioka et al. ............... 347/86 |

(Continued)

FOREIGN PATENT DOCUMENTS

EP 418792 3/1991

(Continued)

OTHER PUBLICATIONS

International Preliminary Report on Patentability, dated Jan. 17, 2008, and English language translation thereof, from corresponding PCT Application No. PCT/JP2006/314008.

*Primary Examiner*—Helene Klemanski
(74) *Attorney, Agent, or Firm*—Fitzpatrick, Cella, Harper & Scinto

(57) ABSTRACT

There is provided a cyan ink for ink jet and an ink jet recording method using the same, which can reduce both reciprocating color uneven and beading without impairing fastness property even when a yellow ink or a magenta ink containing a specific coloring material with excellent fastness property is used. In the ink jet recording method using a yellow ink and a cyan ink, or a magenta ink and a cyan ink, the yellow ink and the magenta ink contain a specific coloring material and have a surface tension of 33.0 mN/m or more and 36.0 mN/m or less, and the cyan ink contains a specific phthalocyanine compound, contains 1,5-pentanediol as an organic solvent, and has a surface tension of 32.9 mN/m or more and 35.4 mN/m or less.

15 Claims, 2 Drawing Sheets

U.S. PATENT DOCUMENTS

| | | |
|---|---|---|
| 2007/0109372 A1 | 5/2007 | Tomioka et al. ............... 347/86 |
| 2007/0109378 A1 | 5/2007 | Yamakami et al. .......... 347/100 |
| 2007/0109390 A1 | 5/2007 | Yamakami et al. .......... 347/105 |

FOREIGN PATENT DOCUMENTS

| | | |
|---|---|---|
| EP | 1626070 | 2/2006 |
| JP | 3-185080 | 8/1991 |
| JP | 2942319 | 6/1999 |
| JP | 2003-238850 | 8/2003 |
| JP | 2003-268274 | 9/2003 |
| JP | 2004-35854 | 2/2004 |
| WO | 2004/104108 | 12/2004 |
| WO | WO 2006/011658 * | 2/2006 |

* cited by examiner

CYAN INK FOR INK JET AND INK JET RECORDING METHOD

This application is a continuation of International Application No. PCT/JP2006/314008, filed Jul. 7, 2006, which claims the benefit of Japanese Patent Application No. 2005-199807, filed Jul. 8, 2005.

BACKGROUND OF THE INVENTION

1. Field of the Invention

The present invention relates to cyan ink for ink jet used with yellow ink and magenta ink having excellent fastness property, and an ink jet recording method using these inks.

2. Description of the Related Art

An ink jet recording method is a recording method of applying a small ink droplet to any one of plain paper or glossy media to form an image, and has become rapidly widespread owing to reduction in costs and improvement in recording speed. In addition to improvement in the quality of images, as digital cameras has rapidly come into wide use, the method has been generally used as a method of outputting photographic images comparable to silver halide photographs.

In recent years, image quality has undergone improvement more than ever owing to, for example, extreme reduction in size of an ink droplet and an improvement of the color gamut involved in the introduction of multi-color inks. There have been growing demands for high level of image quality of recording matters such as reduction of beading. Further, there has been a stronger demand for printing speed.

Toward these demands, an ink containing 2,5-dimethyl-2,5-hexanediol, for example, has been proposed as a technology to improve beading etc. (see Japanese Patent Application Laid-Open No. 2004-35854). Further, an ink containing, as a coloring material, a phthalocyanine compound with a specific structure is disclosed as an ink for providing an image with excellent fastness property (see Japanese Patent No. 2942319).

SUMMARY OF THE INVENTION

However, as a result of investigation by the present inventors, there were some cases where sufficient effects could not be obtained by conventional beading improvement means to devise the kind of coloring material, ink composition or the like. Particularly, it has been found that a green solid image part formed by using cyan ink and yellow ink, and a blue solid image part formed by using cyan ink and magenta ink exhibit remarkably distinguishable beading. In order to meet a recent demand for high quality images, it has been recognized that the beading caused in forming a secondary color like the above case should be reduced. Here, beading means image unevenness attributable to coloring material localization caused by contact of adjacent liquid droplets on or in a recording medium in recording a solid image.

On the other hand, as a method for efficient improvement of recording speed, there may be 1-pass bidirectional recording method in which an image for one scan is formed by a single scan and an image for subsequent one scan is formed by a subsequent scan in a backward direction. In this case, for example, if cyan ink is applied before yellow ink in forming a green image by forward direction scan, cyan ink is applied after yellow ink in forming a green image by backward direction scan. This difference leads to color shade difference between an image formed in a forward direction and an image formed in a backward direction, which is called "reciprocating color uneven." The present inventors have considered that reciprocating color uneven as well as beading are important problems to be solved.

Regarding these problems, the present inventors have made intensive studies. As a result of that, they have found that reciprocating color uneven can be reduced by changing ink permeability from highly penetrable region (surface tension of about 30 mN/m), which is usually used for conventional color inks, to modestly penetrable region (surface tension of about 35 mN/m). However, when ink permeability is changed to modestly penetrable region simply by adjusting an amount of penetrant such as a surfactant, such change sometimes more worsened beading than the use of an ink with highly penetrable region. Further, the present inventors have found that when an ink containing a specific color material with excellent fastness property is used, particularly beading or reciprocating color uneven is likely to be remarkable. The present inventors have made further investigation to solve these new technical problems, consequently arriving at the present invention.

Accordingly, an object of the present invention is to provide a cyan ink for ink jet which can reduce both reciprocating color uneven and beading without impairing fastness property even when a yellow ink or a magenta ink containing a specific coloring material with excellent fastness property is used.

Another object of the present invention is to provide an ink jet recording method using that ink.

That is, the present invention provides an ink jet recording method using yellow ink and cyan ink, the yellow ink containing, as a coloring material, at least one compound selected from compounds of the following A group and at least one compound selected from compounds of the following B group, and having a surface tension of 33.0 mN/m or more and 36.0 mN/m or less; and the cyan ink containing, as a coloring material, a phthalocyanine compound represented by the following general formula (1) or (2), containing 1,5-pentanediol as an organic solvent, and having a surface tension of 32.9 mN/m or more and 35.4 mN/m or less.

A group: C.I. Direct Yellow 132 and C.I. Direct Yellow 173

B group: C.I. Direct Yellow 142, C.I. Direct Yellow 86 and compound represented by the following general formula (3)

General formula (1)

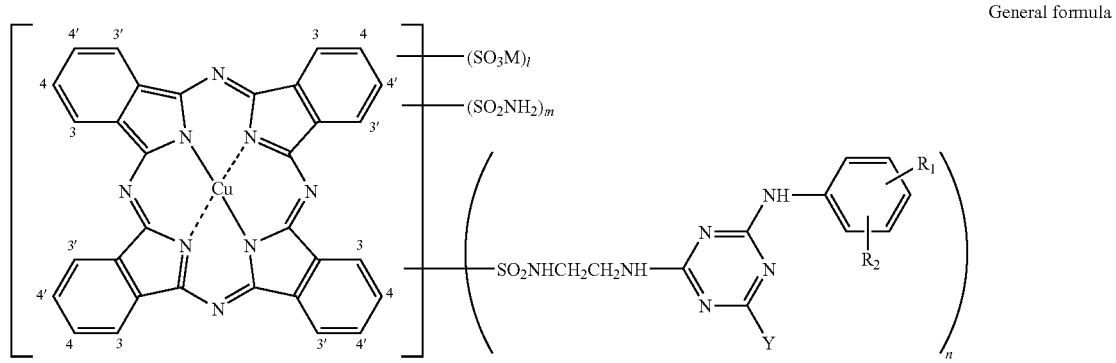

wherein l represents 0 to 2, m represents 1 to 3, and n represents 1 to 3 (provided that l+m+n=3 to 4); a substitution position of a substituent is 4-position or 4'-position; M represents an alkali metal or ammonium; $R_1$ and $R_2$ each independently represent a hydrogen atom, a sulfonic acid group, and a carboxyl group (provided that $R_1$ and $R_2$ are not simultaneously a hydrogen atom); Y represents a chlorine atom, a hydroxyl group, an amino group, or a monoalkylamino or dialkylamino group.

General formula (2)

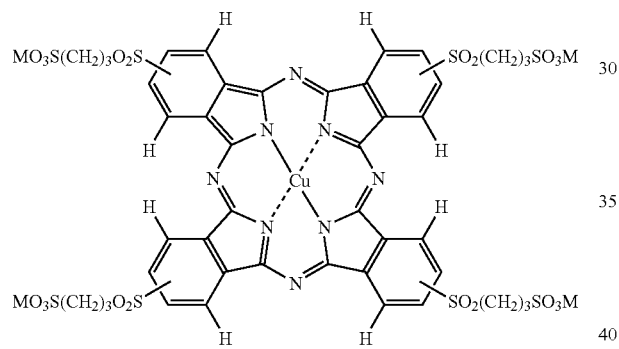

wherein M is a counter ion of a sulfonic acid group, and represents a hydrogen atom, an alkali metal, ammonium, or organic ammonium.

General formula (3)

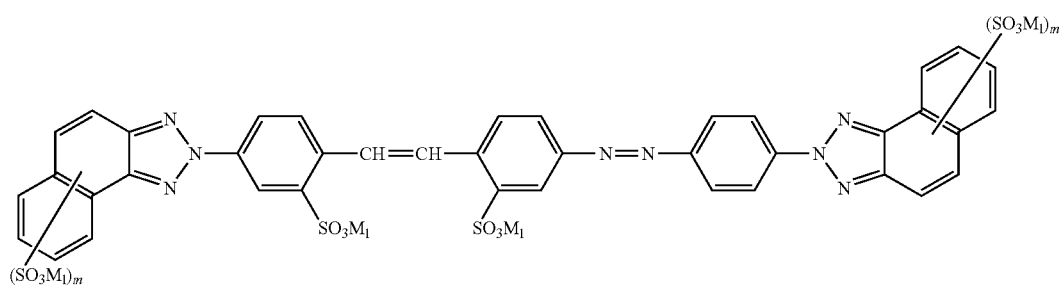

wherein m each independently represents 1 or 2; and $M_1$ represents a hydrogen atom, an alkali metal, an alkali earth metal, a cation of organic amine or an ammonium ion.

Further, the present invention provides an ink jet recording method using magenta ink and cyan ink, the magenta ink containing, as a coloring material, anthrapyridone compound represented by the following general formula (4) or a salt thereof and having a surface tension of 33.0 mN/m or more and 36.0 mN/m or less; and the cyan ink containing, as a coloring material, phthalocyanine compound represented by the following general formula (1) or (2), containing as an organic solvent 1,5-pentanediol, and having a surface tension of 32.9 mN/m or more and 35.4 mN/m or less.

General formula (1)

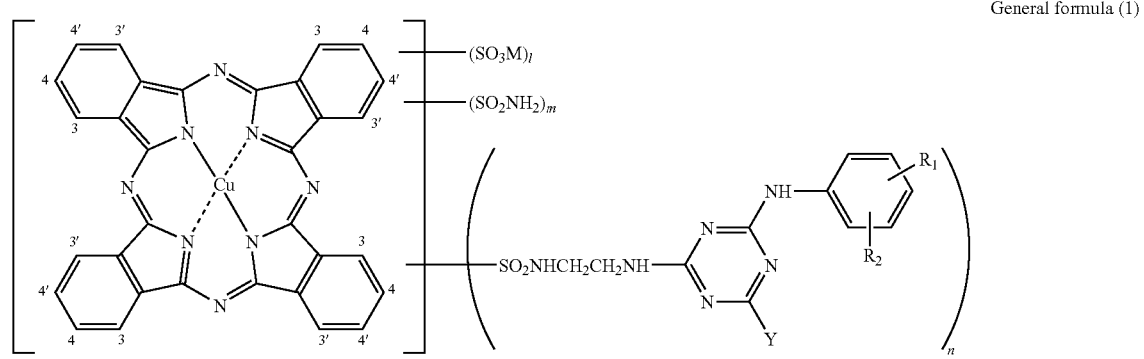

wherein l represents 0 to 2, m represents 1 to 3, and n represents 1 to 3 (provided that l+m+n=3 to 4); a substitution position of a substituent is 4-position or 4'-position; M represents an alkali metal or ammonium; $R_1$ and $R_2$ each independently represent a hydrogen atom, a sulfonic acid group, and a carboxyl group (provided that $R_1$ and $R_2$ are not simultaneously a hydrogen atom); Y represents a chlorine atom, a hydroxyl group, an amino group, or a monoalkylamino or dialkylamino group.

General formula (2)

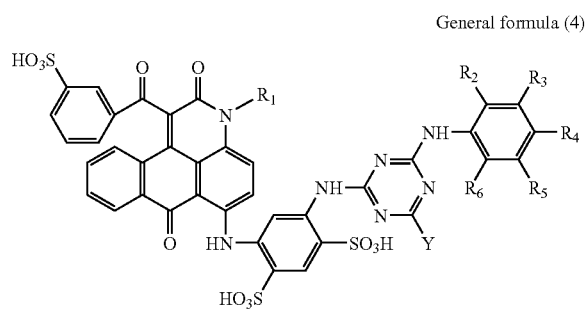

wherein M is a counter ion of a sulfonic acid group, and represents a hydrogen atom, an alkali metal, ammonium, or organic ammonium.

General formula (4)

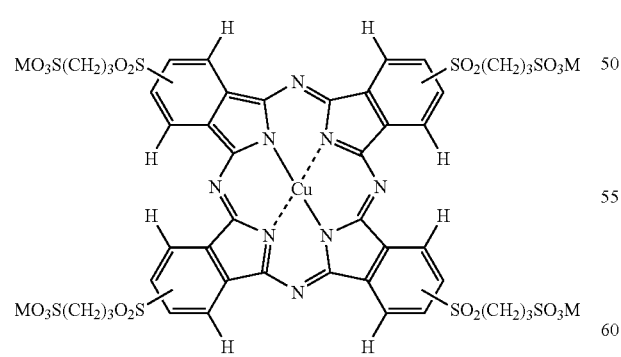

wherein $R_1$ represents any of a hydrogen atom, an alkyl group, a hydroxyl lower alkyl group, a cyclohexyl group, a mono- or di- alkylaminoalkyl group, and a cyano lower alkyl group; Y represents a chlorine atom, a hydroxyl group, an amino group, or a mono- or di- alkylamino group (in which the alkyl moiety may have a substituent selected from the group consisting of a sulfonic acid group, a carboxyl group and hydroxyl group); and $R_2$, $R_3$, $R_4$, $R_5$ and $R_6$ each independently represent a hydrogen atom, an alkyl group having 1 to 8 carbon atoms and a carboxyl group (provided that all of $R_2$, $R_3$, $R_4$, $R_5$ and $R_6$ are not simultaneously a hydrogen atom).

Further, the present invention provides an ink jet recording method using yellow ink, magenta ink and cyan ink, the yellow ink containing, as a coloring material, at least one compound selected from compounds of the above A group and at least one compound selected from compounds of the above B group, and having a surface tension of 33.0 mN/m or more and 36.0 mN/m or less; the magenta ink containing an anthrapyridone compound represented by the above general formula (4) or a salt thereof, and having a surface tension of 33.0 mN/m or more and 36.0 mN/m or less; and the cyan ink containing, as a coloring material, a phthalocyanine compound represented by the above general formula (1) or (2), containing 1,5-pentanediol as an organic solvent, and having a surface tension of 32.9 mN/m or more and 35.4 mN/m or less.

Furthermore, the present invention is a cyan ink for ink jet characterized in that the ink is used for the above ink jet recording method.

Accordingly, an object of the present invention is provide a cyan ink for ink jet, which does not damage fastness property even when a yellow ink or a magenta ink containing a specific coloring material having excellent fastness property, and can achieve the reduction of both reciprocating color uneven and beading.

Further, an object of the present invention is to provide an ink jet recording method using such ink.

The present invention provides a cyan ink for ink jet, which can reduce both reciprocating color uneven and beading without impairing fastness property even when a yellow ink or a magenta ink containing a specific coloring material with excellent fastness property is used. Further, the present invention provides an ink jet recording method, which can improve fastness property of an image, reduce reciprocating color uneven and beading by using the ink.

Further features of the present invention will become apparent from the following description of exemplary embodiments with reference to the attached drawings.

DESCRIPTION OF THE EMBODIMENTS

Figure 1:
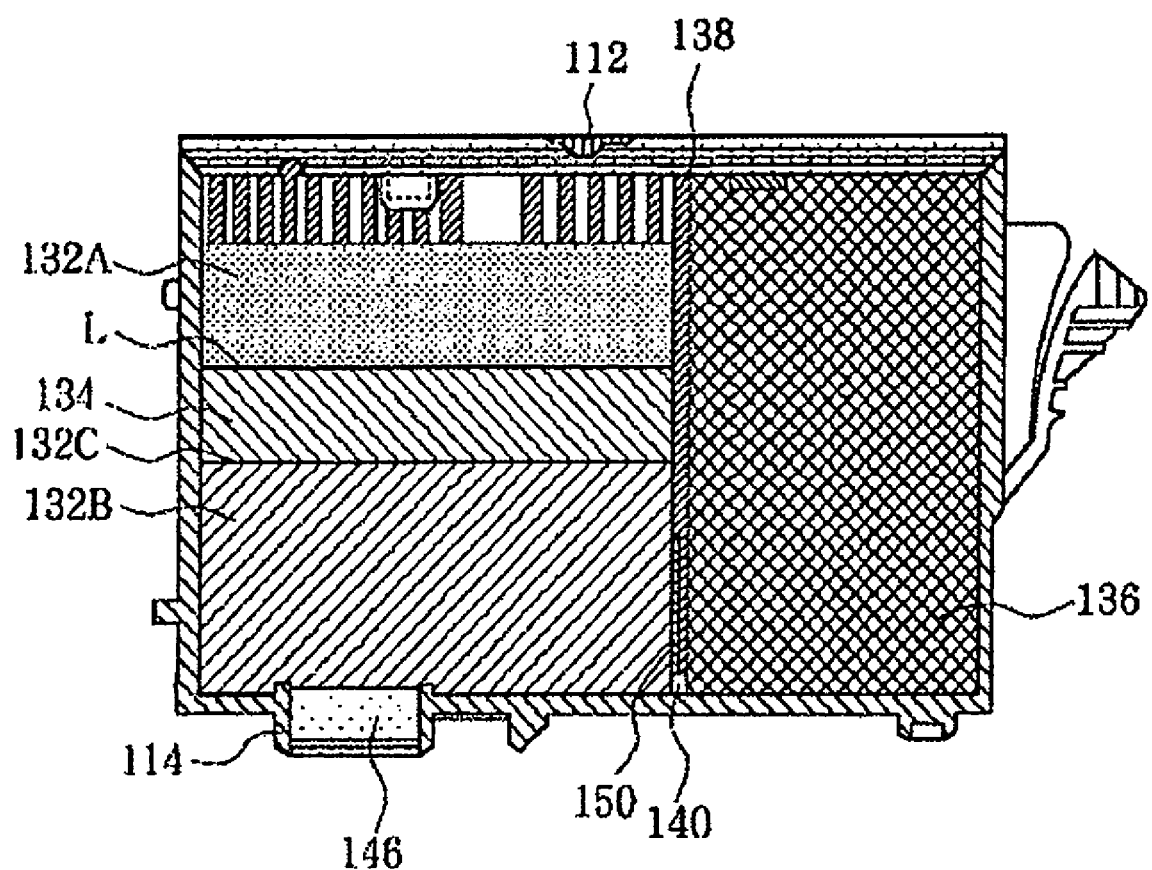
FIG. 1 is a schematic view describing a liquid-storing container as a preferable ink cartridge for recording with an ink of the present invention.

Hereinafter, the present invention will be described in more detail by way of preferred embodiments. Note that when a compound used in the present invention is a salt, the salt is dissociated into ions in ink, but this state is represented by using the phrase "contains a salt" for convenience.

<Ink for Ink Jet>

(Coloring Material for Cyan Ink)

To achieve the objects of the present invention, one of the performances required for cyan ink is that the cyan ink should have the same level of fastness property as yellow ink or magenta ink which is used together in forming an image and contain a specific coloring material, in particular have high fastness property against ozone present in air. According to the investigation by the present inventors, that can be achieved by using a coloring material selected from phthalocyanine compounds represented by the following general formulae (1) and (2). These coloring materials can be used alone, or two or more of them can be used as a mixture. In the present invention, a phthalocyanine compound represented by the general formula (1) is preferably used.

General formula (1)

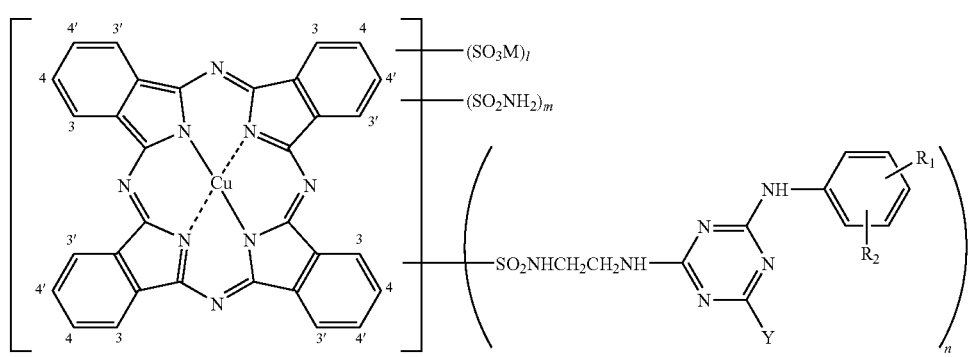

wherein l represents 0 to 2, m represents 1 to 3, and n represents 1 to 3 (provided that l+m+n=3 to 4); a substitution position of a substituent is 4-position or 4'-position; M represents an alkali metal or ammonium; $R_1$ and $R_2$ each independently represent a hydrogen atom, a sulfonic acid group, and a carboxyl group (provided that $R_1$ and $R_2$ are not simultaneously a hydrogen atom); Y represents a chlorine atom, a hydroxyl group, an amino group, or a monoalkylamino or dialkylamino group.

General formula (2)

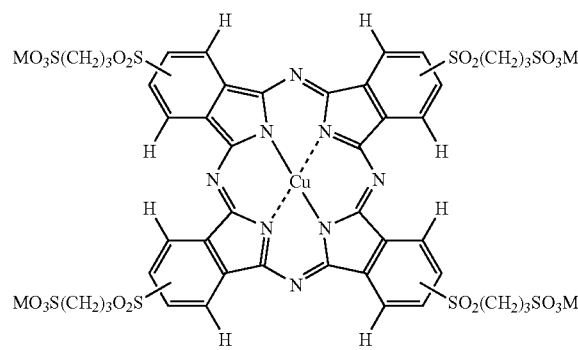

wherein M is a counter ion of a sulfonic acid group, and represents a hydrogen atom, an alkali metal, ammonium, or organic ammonium.

The content of the above coloring material is preferably 1.0 mass % or more and 10.0 mass % or less with respect to the total mass of ink. If the content of the coloring material is less than 1.0 mass %, remarkable advantages of the present invention may be insufficient. On the other hand, if the content of the coloring material exceeds 10.0 mass %, ink fixation is likely to occur. Further, in order to sufficiently obtain advantages of the present invention, the content of the coloring material is preferably 1.5 mass % or more. Also, in order to sufficiently obtain other ink jet characteristics such as fixing resistance, the content of the coloring material is preferably 6.0 mass % or less.

(Coloring Material for Magenta Ink)

In order to achieve the objects of the present invention, one of performances required for magenta ink is to have excellent fastness property, particularly high fastness property to ozone present in air. According to the investigation of the present inventors, the above is achieved by using a coloring material selected from the anthrapyridone compounds represented by the following general formula (4). This coloring material may be used alone, or two or more of them may be used as a mixture.

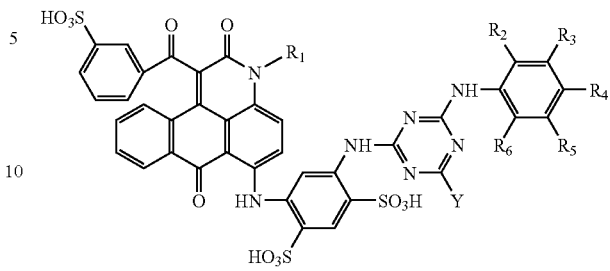

General formula (4)

wherein $R_1$ represents any of a hydrogen atom, an alkyl group, a hydroxyl lower alkyl group, a cyclohexyl group, a mono- or di- alkylaminoalkyl group, and a cyano lower alkyl group; Y represents a chlorine atom, a hydroxyl group, an amino group, or a mono- or di- alkylamino group (in which the alkyl moiety may have a substituent selected from the group consisting of a sulfonic acid group, a carboxyl group and hydroxyl group); and $R_2$, $R_3$, $R_4$, $R_5$ and $R_6$ each independently represent a hydrogen atom, an alkyl group having 1 to 8 carbon atoms and a carboxyl group (provided that all of $R_2$, $R_3$, $R_4$, $R_5$ and $R_6$ are not simultaneously a hydrogen atom).

Preferred specific examples of the anthrapyridone compound represented by the above general formula (4) include the following exemplified compounds (4-1) to (4-7). Among these, exemplified compound (4-5) is particularly preferred. Here, all of the exemplified compounds are shown in the form of a free acid.

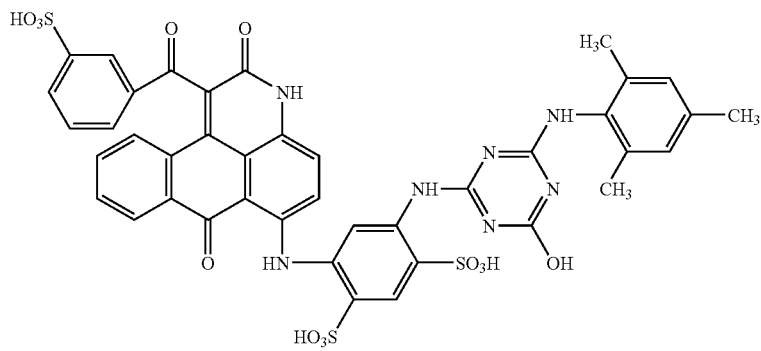

(4-1)

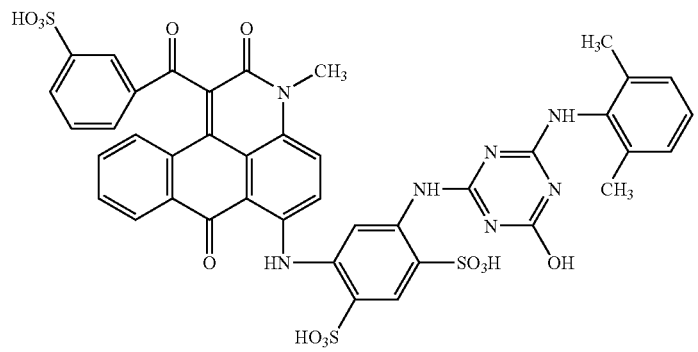

(4-2)

-continued
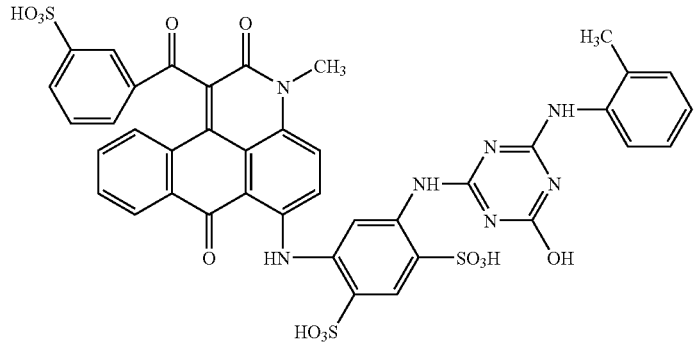
(4-3)
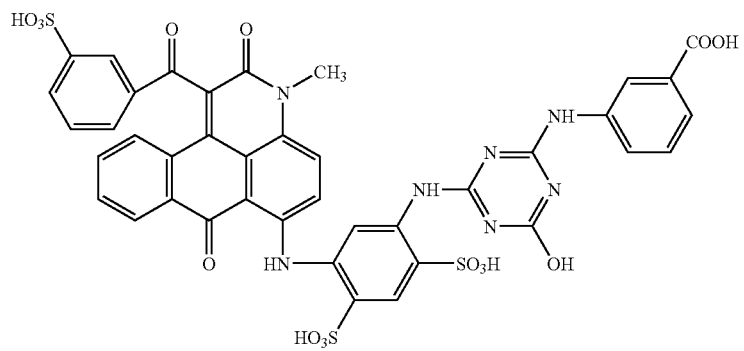
(4-4)
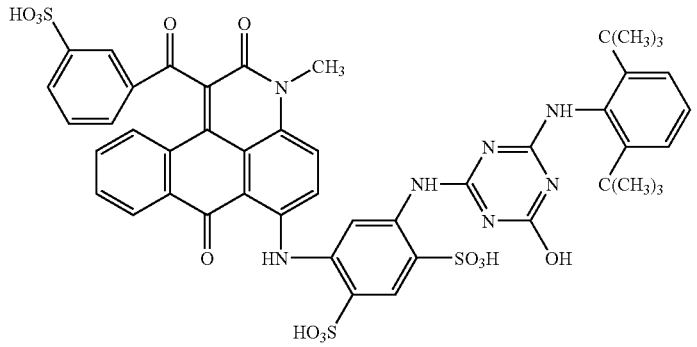
(4-5)
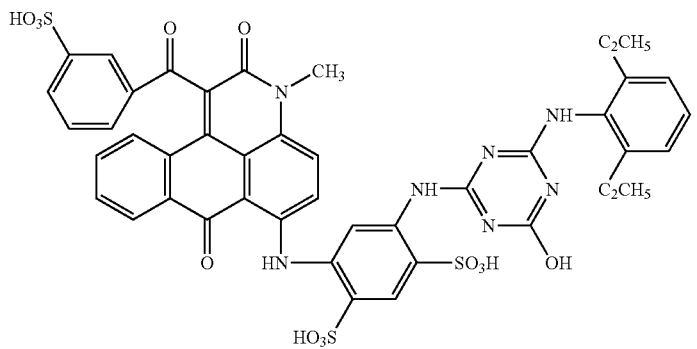
(4-6)

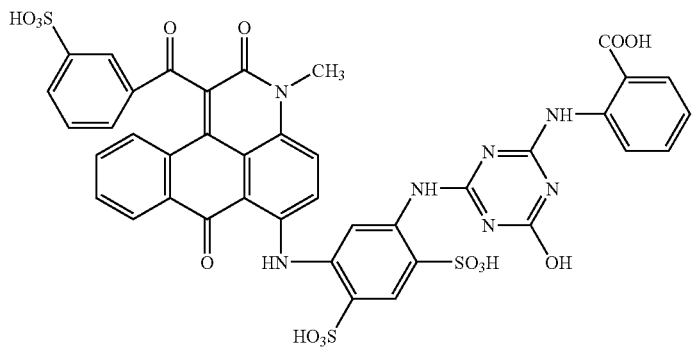

(4-7)

The content of the above coloring material is preferably 1.0 mass % or more and 10.0 mass % or less with respect to the total mass of ink. If the content of the coloring material is less than 1.0 mass %, remarkable advantages of the present invention may be insufficient. On the other hand, if the content of the coloring material exceeds 10.0 mass %, ink fixation is likely to occur. In order to sufficiently obtain advantages of the present invention, the content of the coloring material is further preferably 1.5 mass % or more. Also, in order to sufficiently obtain other ink jet characteristics such as fixing resistance, the content of the coloring material is further preferably 6.0 mass % or less.

(Coloring Material for Yellow Ink)

In order to achieve the objects of the present invention, one of the performances required for yellow ink is to have excellent fastness property, particularly high fastness property toward ozone present in air. According to the investigation of the present inventors, that is achieved by using the combination of at least one compound selected from compounds of the following A group and at least one compound selected from compounds of the following B group. One coloring material selected from each group may be used alone, or two or more of them may be used as a mixture.

A group: C.I. Direct Yellow 132, C.I. Direct Yellow 173

B group: C.I. Direct Yellow 142, C.I. Direct Yellow 86 and a compound represented by the following general formula (3)

General formula (3)

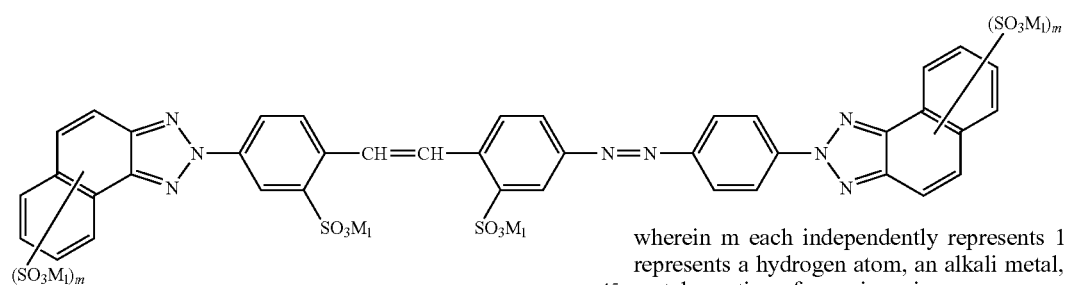

wherein m each independently represents 1 or 2; and $M_1$ represents a hydrogen atom, an alkali metal, an alkali earth metal, a cation of organic amine or an ammonium ion.

Preferable specific examples of the compound represented by the above general formula (3) include structures listed in the following Table 1. Here, cyclic structures present at both ends of the above general formula (3) are named as A and B rings, and the substitution position is defined as indicated in the following formula. The numbers of the following Table 1 indicate positions, which are substituted by sulfonic acid in exemplified compounds Y1 to Y5

General formula (3)

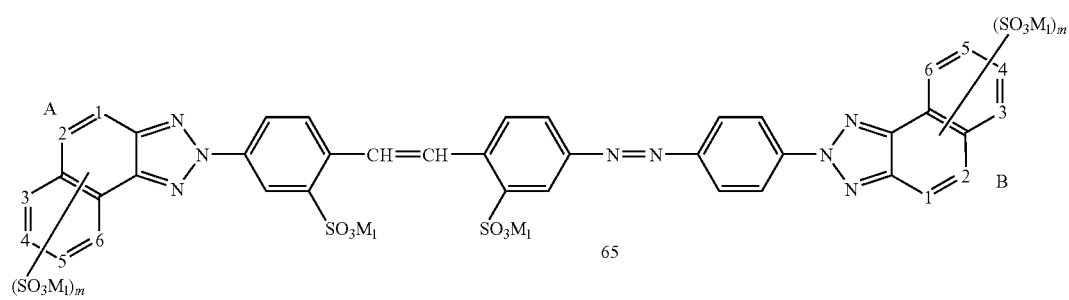

wherein m each independently represents 1 or 2; and $M_1$ represents a hydrogen atom, an alkali metal, an alkali earth metal, a cation of organic amine or an ammonium ion.

TABLE 1

Exemplified compounds Y1 to Y4

| No. | Position of substituent of A ring | Position of substituent of B ring |
|---|---|---|
| Y1 | 2 | 4 |
| Y2 | 4 | 4 |
| Y3 | 2 | 4, 6 |
| Y4 | 4, 6 | 4 |

In the present invention, C.I. Direct Yellow 132 and a compound represented by the above general formula (3) are preferably selected as coloring materials from A and B groups, respectively. Further, as a compound represented by the above general formula (3), an exemplified compound Y1 represented by the following formula is particularly preferred.

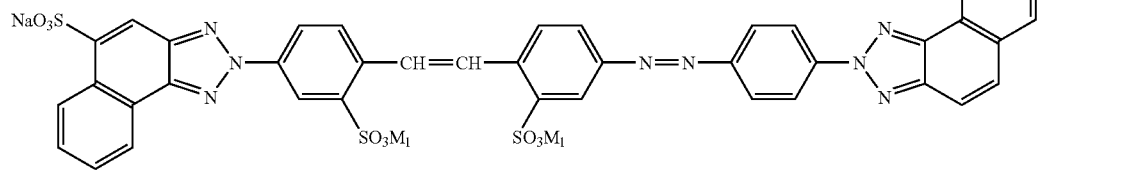

Exemplified compound Y1

The content of the above coloring material is preferably 1.0 mass % or more and 10.0 mass % or less with respect to the total mass of ink. If the content of the coloring material is less than 1.0 mass %, remarkable advantages of the present invention may be insufficient. On the other hand, if the content of the coloring material exceeds 10.0 mass %, ink fixation is likely to occur. Further, in order to sufficiently obtain advantages of the present invention, the content of the coloring material is preferably 1.5 mass % or more. Also, in order to sufficiently obtain other ink jet characteristics such as fixing resistance, the content of the coloring material is preferably 6.0 mass % or less. Furthermore, in the present invention, the ratio (A:B) between the coloring material selected from A group and the coloring material selected from B group is preferably 2:1 to 7:1 in mass ratio.

(Other Coloring Material)

In the present invention, a coloring material other than the above ones may be used as long as remarkable advantages of the present invention can be obtained. Further, in the present invention, yellow ink, magenta ink and cyan ink may be used together with an ink with other hues such as black ink, red ink, blue ink and green ink. Examples of mixable coloring materials and coloring materials contained in inks with other hues are listed hereinafter, but a coloring material is not limited thereto.

C.I. Direct Yellow: 8, 11, 12, 27, 28, 33, 39, 44, 50, 58, 85, 86, 87, 88, 89, 98, 100, 110, 132, 173 and the like C.I. Acid Yellow: 1, 3, 7, 11, 17, 23, 25, 29, 36, 38, 40, 42, 44, 76, 98, 99 and the like C.I. Pigment Yellow: 1, 2, 3, 12, 13, 14, 15, 16, 17, 73, 74, 75, 83, 93, 95, 97, 98, 114, 128, 138, 180 and the like C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230 and the like C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289 and the like C.I. Food Red: 87, 92, 94 and the like C.I. Direct Violet: 107 and the like C.I. Pigment Red: 2, 5, 7, 12, 48:2, 48:4, 57:1, 112, 122, 123, 168, 184, 202 and the like C.I. Direct Blue: 1, 15, 22, 25, 41, 76, 77, 80, 86, 90, 98, 106, 108, 120, 158, 163, 168, 199, 226, 307 and the like C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244 and the like C.I. Pigment Blue: 1, 2, 3, 15, 15:2, 15:3, 15:4, 16, 22, 60 and the like C.I. Acid Orange: 7, 8, 10, 12, 24, 33, 56, 67, 74, 88, 94, 116, 142 and the like C.I. Acid Red: 111, 114, 266, 374 and the like C.I. Direct Orange: 26, 29, 34, 39, 57, 102, 118 and the like C.I. Food Orange: 3 and the like C.I. Reactive Orange: 1, 4, 5, 7, 12, 13, 14, 15, 16, 20, 29, 30, 84, 107 and the like C.I. Disperse Orange: 1, 3, 11, 13, 20, 25, 29, 30, 31, 32, 47, 55, 56 and the like C.I. Pigment Orange: 43 and the like C.I. Pigment Red: 122, 170, 177, 194, 209, 224 and the like C.I. Acid Green: 1, 3, 5, 6, 9, 12, 15, 16, 19, 21, 25, 28, 81, 84 and the like C.I. Direct Green: 26, 59, 67 and the like C.I. Food Green: 3 and the like C.I. Reactive Green: 5, 6, 12, 19, 21 and the like C.I. Disperse Green: 6, 9 and the like C.I. Pigment Green: 7, 36 and the like C.I. Acid Blue: 62, 80, 83, 90, 104, 112, 113, 142, 203, 204, 221, 244 and the like C.I. Reactive Blue: 49 and the like C.I. Acid Violet: 17, 19, 48, 49, 54, 129 and the like C.I. Direct Violet: 9, 35, 47, 51, 66, 93, 95, 99 and the like C.I. Reactive Violet: 1, 2, 4, 5, 6, 8, 9, 22, 34, 36 and the like C.I. Disperse Violet: 1, 4, 8, 23, 26, 28, 31, 33, 35, 38, 48, 56 and the like C.I. Pigment Blue: 15:6 and the like C.I. Pigment Violet: 19, 23, 37 and the like C.I. Direct Black: 17, 19, 22, 31, 32, 51, 62, 71, 74, 112, 113, 154, 168, 195 and the like C.I. Acid Black: 2, 48, 51, 52, 110, 115, 156 and the like
C.I. Food Black: 1, 2 and the like
Carbon Black
(1,5-pentanediol)

The cyan ink for ink jet of the present invention contains 1,5-pentanediol as an organic solvent. In keeping the permeability of ink in modestly penetrable region (surface tension of about 33 mN/m), 1,5-pentanediol is used to adjust surface tension, and thereby the deterioration of beading, which has conventionally occurred, can be suppressed. The reason for this is not known, but it is assumed that it is attributable to interaction of structure or polarity between a coloring material and 1,5-pentanediol. The content of 1,5-pentanediol is preferably 2.0 mass % or more and 8.0 mass % or less with respect to the total mass of ink. The content of less than 2.0 mass % is likely to result in insufficient beading suppression. On the other hand, if the content exceeds 8.0 mass %, the value of surface tension is likely to be large and the suppression for reciprocating color uneven and further for beading becomes insufficient. Yellow ink or magenta ink to be used with cyan ink for ink jet of the present invention may contain 1,5-pentanediol, too.

(Water-soluble Organic Solvent and Additives)

In the present invention, other aqueous medium or an additive is not particularly limited, as long as the cyan ink contains a specific coloring material and 1,5-pentanediol as a water-soluble organic solvent, and has a specific range of surface tension (modestly penetrable region). Other aqueous medium or an additive is not particularly limited, as long as a yellow ink and a magenta ink to be used with the cyan ink of the present invention each contain a specific coloring material and have a specific range of surface tension (modestly penetrable region).

Accordingly, compounds, such as water, water-soluble organic solvent and an additive, except the above-mentioned substances usable for cyan ink, magenta ink and yellow ink, are not particularly limited.

There are no particular limitations on the water soluble organic solvent as long as it is water-soluble, and examples thereof include alcohols, polyalcohols, polyglycols, glycol ether, nitrogen-containing polar solvent and sulfur-containing polar solvent. Hereinafter, examples of water-soluble organic solvent usable in the present invention are listed, but the water-soluble organic solvent is not limited thereto.

Examples thereof include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexanetriol, thio diglycol, hexylene glycol, and diethylene glycol; lower alkyl ether acetates such as polyethylene glycol monomethyl ether acetate; lower alkyl ethers of polyalcohols such as ethylene glycol monomethyl (or ethyl) ether, diethylene glycol methyl (or ethyl) ether, and triethylene glycol monomethyl (or ethyl) ether; polyalcohols such as trimethylolpropane and trimethylolethane; glycerin; N-methyl-2-pyrrolidone; 2-pyrrolidone; and 1,3-dimethyl-2-imidazolidinone. Any of the above water-soluble organic solvents may be used alone, or may be used in the form of a mixture.

Further, if necessary, each ink constituting the ink set may contain various additives such as a surfactant, a pH adjuster, a rust inhibitor, an antiseptic, a mildewproofing agent, an antioxidant, an anti-reducing agent, an evaporation accelerator, a chelating agent and a water-soluble polymer.

(Surface Tension)

In the present invention, the surface tensions defined for cyan ink, yellow ink and magenta ink are important values for exhibiting effects of the present invention. As a result of intensive investigation by the present inventors to achieve the objects of the present invention, the surface tension of each ink in the present invention is preferably near modestly penetrable region. Further, considering the permeation speed to paper, the inks preferably have small difference in surface tension from one another. From these findings, the surface tension values of the present invention have been derived. That is, when a difference in surface tension from an ink to be used therewith becomes large, reciprocating color uneven tends to be worsened. Specifically, yellow ink has a surface tension of 33.0 mN/m or more and 36.0 mN/m or less. Magenta ink has a surface tension of 33.0 mN/m or more and 36.0 mN/m or less. Cyan ink has a surface tension of 32.9 mN/m or more and 35.4 mN/m or less. In the present invention, specific means for keeping the surface tensions in the above ranges is not limited. However, it is essential that yellow ink and magenta ink should contain a specific coloring material and cyan ink should contain a specific coloring material and a specific organic solvent.

In the present invention, the surface tension of ink was measured using an automatic surface tension meter CBVP-Z (manufactured by Kyowa Interface Science Co., Ltd.) under an environment of temperature of 25° C. and humidity of 50% by a plate method using a platinum plate. Here, other methods are not excluded as long as they are the same method.

(Ink Jet Recording Method)

The cyan ink of the present invention is preferably used for an ink jet recording method which conducts recording on a recording medium by ejecting the ink from an orifice in response to a recording signal. In particular, the ink can be preferably used for an ink jet recording method in which thermal energy is utilized in conducting recording on a recording medium. Further, as mentioned above, reciprocating color uneven remarkably occurs particularly in using single-pass bidirectional recording, and thus it is very preferred to use the present invention in adopting this recording method.

(Ink Cartridge)

A preferred specific example of an ink cartridge suitable for conducting ink jet recording by using a cyan ink of the present invention is described.

FIG. 1 is a schematic explanatory and cross-sectional view of a liquid-storing container serving as an ink cartridge suitable for use in conducting ink jet recording by using a cyan ink of the present invention. In FIG. 1, the liquid-storing container (ink tank) has a structure such that it is in communication with the atmosphere at an upper section via an air vent 112 and is in communication with an ink supply port 114 at a lower section. Further, the liquid-storing container (ink tank) is partitioned by a partitioning wall 138 into a negative pressure generation member holding chamber 134, which holds a negative pressure generation member, and a liquid-storing chamber 136, which is substantially sealed and stores the liquid ink. The negative pressure generation member holding chamber 134 and the liquid-storing chamber 136 are in communication with each other only through a communication hole 140 formed in the partitioning wall 138 near a bottom section of the liquid-storing container (ink tank), and an air lead-in groove (air lead-in path) 150 for accelerating the introduction of air into the liquid-storing chamber during liquid supply operation. A plurality of ribs are formed in an integrated manner on an upper wall of the liquid-storing container (ink tank) which forms the negative pressure generation member holding chamber 134 so as to project into the inside, wherein the ribs are brought into contact with the negative pressure generation member, which is held in a compressed state, in the negative pressure generation member holding chamber 134. These ribs form an air buffer chamber between the upper wall and an upper surface of the negative pressure generation member.

Further, a pressure contact member 146 having greater capillary force and physical strength than the negative pressure generation member, is stored in an ink supply pipe provided with the ink supply port 114, whereby the ink supply pipe is brought into pressure contact with the negative pressure generation member. Two capillary force generation type negative pressure generation members, composed of a first negative pressure generation member 132B and a second negative pressure generation member 132A made from an olefin resin fiber such as polyethylene, are held as the negative pressure generation members in the negative pressure generation member holding chamber of the present embodiment. The member 132C is a boundary layer between these two negative pressure generation members, wherein the intersection of the boundary layer 132C with the partitioning wall 138 exists above the upper edge of the air lead-in groove (air lead-in path) 150 in the configuration in which the liquid-storing container is being used with its communication part positioned downward. Further, the ink held in the negative pressure generation members is present up to a level higher than the above-described boundary layer 132C, as indicated by the liquid surface L of the ink.

Here, the first negative pressure generation member is brought into pressure contact with the boundary layer of the second negative pressure generation member, so that the compression ratio in the vicinity of the boundary layer of the negative pressure generation members is higher than that in the other sections, whereby strong capillary force is generated. That is, when the capillary force of the first negative pressure generation member is represented by P1, the capillary force of the second negative pressure generation member by P2 and the capillary force possessed by the interface between the negative pressure generation members by PS, the relationship P2<P1<PS is satisfied.

Figure 2:
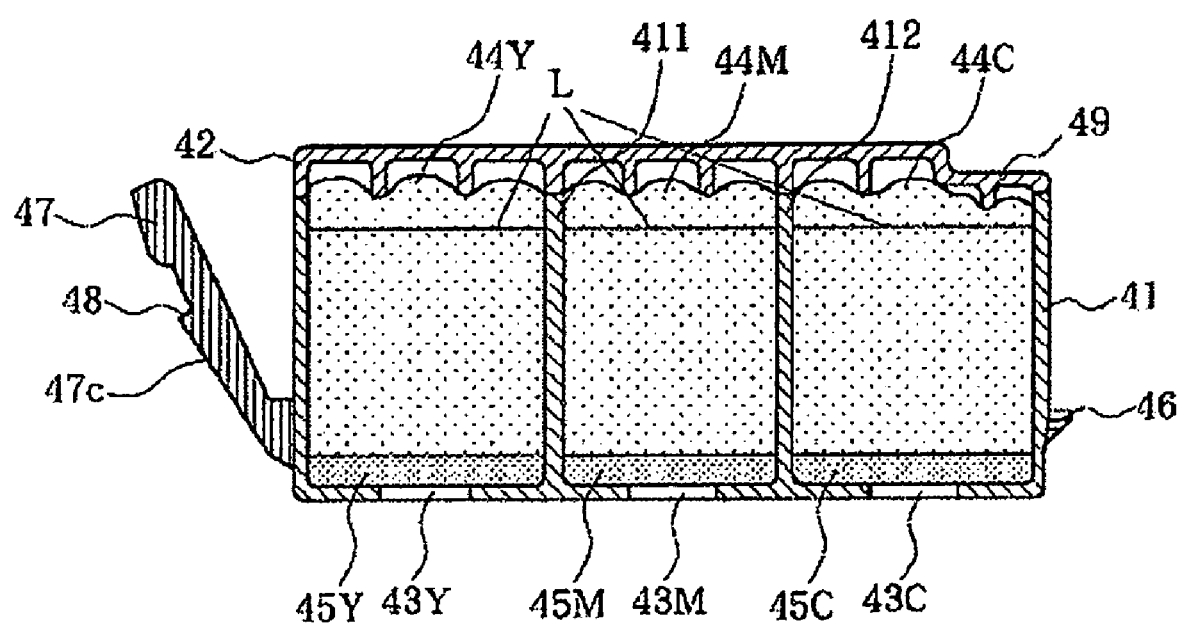
FIG. 2 is a schematic view describing a liquid-storing container as a preferable ink cartridge for recording with an ink of the present invention.

FIG. 2 is a schematic explanatory and cross-sectional view of a liquid-storing container which is another ink cartridge suitable for conducting recording by using an ink of the present invention. The ink cartridge has a container 41 for storing three colors of inks (yellow (Y), magenta (M) and cyan (C)), and a cap member 42 which covers the container 41. The interior of the container 41 is partitioned into three spaces which have an approximately equal capacity by two partitioning plates 411 and 412 disposed parallel to each other for storing the three ink colors. These three spaces are aligned in a direction into which the color ink tank is inserted when mounting the color ink tank onto an ink tank holder. These three spaces hold respectively an ink absorbing body 44Y for absorbing and retaining a yellow ink, an ink absorbing body 44M for absorbing and retaining a magenta ink, and an ink absorbing body 44C for absorbing and retaining a cyan ink. The inks held in these absorbing bodies 44Y, 44M and 44C, which act as negative pressure generation members, are present up to a level higher than the upper sections of the respective absorbing bodies, as indicated by the liquid surface L of the ink. This ink cartridge may be further provided with an ink jet recording head having ejection ports for Y, M and C, respectively.

EXAMPLES

Hereinafter, the present invention will be described in more detail by way of examples, but these examples do not limit the scope of the present invention. Unless otherwise specified, each ink component in examples and comparative examples is expressed in "part(s) by mass." Also, "part" and "%" in the description are based on mass unless otherwise stated.

<Synthesis of Coloring Material>

(Coloring Material for Cyan Ink)

Sulfolane, monosodium 4-sulfophthalate, ammonium chloride, urea, ammonium molybdate, and copper (II) chloride were mixed, stirred, and washed with methanol. Thereafter, water was added to the resultant product, and an aqueous solution of sodium hydroxide was used to adjust the pH of the solution to 11. An aqueous solution of hydrochloric acid was added to the resultant solution under stirring, and then sodium chloride was gradually added to precipitate crystals. The resultant precipitated crystals were filtered and washed with a 20% aqueous solution of sodium chloride, and then methanol was added. The separated out crystals were filtered out, washed with a 70% aqueous solution of methanol, and dried to yield tetrasodium copper phthalocyanine tetrasulfonate as blue crystals.

Next, the above-obtained tetrasodium copper phthalocyanine tetrasulfonate was gradually added to chlorosulfonic acid, and then thionyl chloride was added dropwise to perform a reaction. Thereafter, the reaction solution was cooled, and the precipitated crystals were filtered out to prepare a wet cake of copper phthalocyanine tetrasulfonic chloride. The resultant was stirred to prepare a suspension. Ammonia water and a compound represented by the following formula (a)

were added to the suspension, and water and sodium chloride were added to the mixture to precipitate crystals. The precipitated crystals were filtered, washed with an aqueous solution of sodium chloride, again filtered and washed, and then dried to yield a coloring material represented by the formula (C-a) to be used in this example.

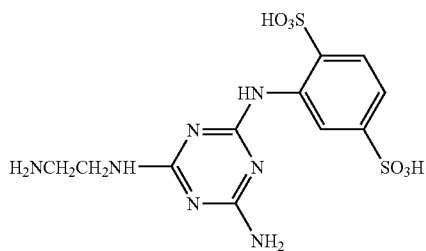

Formula (α)

A compound represented by the above formula (α) was synthesized in the following manner. Lipal OH, cyanuric chloride, and monosodium aniline-2,5-disulfonate were added to ice water, and an aqueous solution of sodium hydroxide was added. Next, an aqueous solution of sodium hydroxide was added to the reaction solution to adjust the pH of the reaction solution to 10.0. To the reaction solution, 28% ammonia water and ethylenediamine were added to perform a reaction. Sodium chloride and concentrated hydrochloric acid were added dropwise to the resultant reaction solution to precipitate crystals. The precipitated crystals were filtered out and fractionated, and was washed with a 20% aqueous solution of sodium chloride to prepare a wet cake. Methanol and water were added to the resultant wet cake, and the whole was filtered, washed with methanol, and dried to yield a compound represented by the above formula (α).

wherein l represents 0 to 2, m represents 1 to 3, and n represents 1 to 3 (provided that l+m+n=3 to 4 and m≧1); positions at which the substituents are present are the 4- or 4'- position; and M represents sodium.

(Coloring Material for Yellow Ink)

Diazotized 4-nitro-4'-aminostilbene-2,2-disulfonic acid and 3-aminonaphthalene-1-sulfonic acid were subjected to coupling. The resultant was triazotized, and a nitro group of the triazotized product was reduced to an amino group to produce aminostilbene-triazole. Aminostilbene-triazole obtained was dissolved into water, and sodium nitrite and hydrochloric acid were added dropwise to the solution to perform diazotization. The resultant diazotized product was added dropwise to an aqueous solution of a compound represented by the following formula (β), and the whole was subjected to coupling, followed by dialysis with sodium chloride. The compound was diazotized with an aqueous solution of sodium nitrite, and was triazotized by adding an aqueous solution of 6-aminonaphthalene-2-sulfonic acid to the obtained turbid solution. The triazotized product was dialyzed with sodium chloride to yield a coloring material represented by the formula (Y-a) to be used in this example.

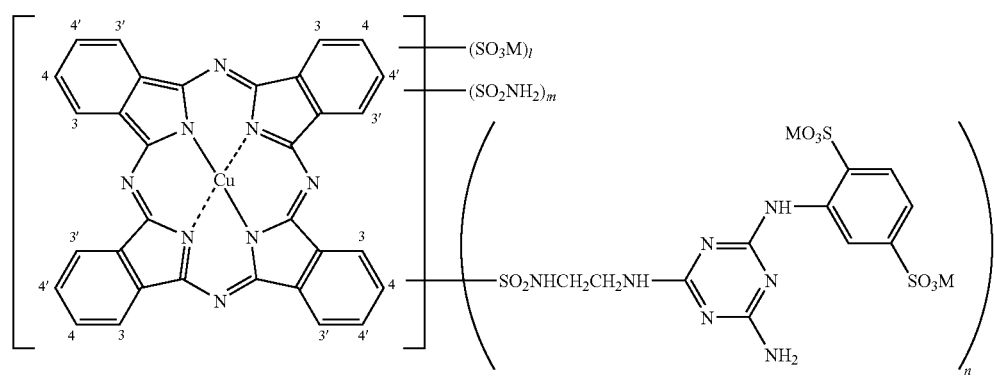

Formula (C-a)

Formula (β)

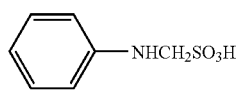

Formula (Y-a)

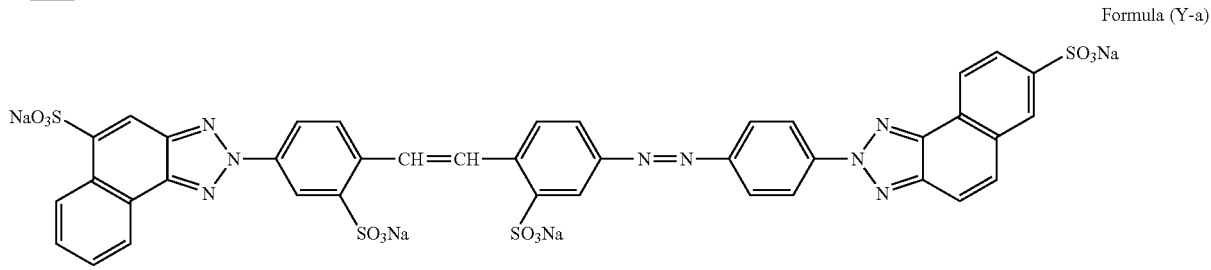

(Coloring Material for Magenta Ink)

The compound represented by the following formula (γ), sodium carbonate, and ethyl benzoyl acetate were allowed to react with one another in xylene, and the reactant was filtered and washed. To the resultant, were sequentially added m-amino acetanilide, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide. Anthranilic acid was added to the reaction liquid to carry out a condensation reaction in the presence of sodium hydroxide. The resultant was filtered and washed to yield a coloring material represented by the formula (M-a) to be used in this example.

Formula (γ)

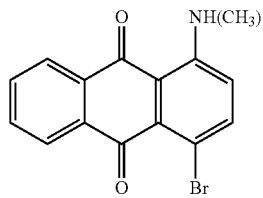

Formula (M-a)

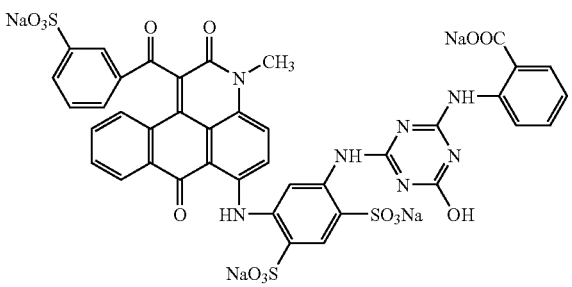

<Preparation of Ink>

(Preparation of Cyan Ink)

Prepared were 11 kinds of cyan inks which have the formulation shown in the following Table 2 and contain the above-obtained coloring material (C-a). At that time, respective components were mixed and the mixtures were filtered through a membrane filter having a pore size of 0.2 μm under pressure to obtain cyan inks C1 to C11. Here, the following compositions are expressed in "part(s) by mass."

TABLE 2

Composition and surface tension of cyan inks C1 to C11 (unit: part)

| | Ink composition | | | | | | | | |
|---|---|---|---|---|---|---|---|---|---|
| | Colorant | Organic solvent | | | | | | Ion-exchanged water | Surface tension (mN/m) |
| | C-a | Gly | EG | 2P | 1,5-PD | DEG | EU | A-EH | | |
| C1 | 6.0 | 5.0 | 8.0 | 5.0 | — | — | 5.0 | 0.6 | 70.4 | 33.2 |
| C2 | 6.0 | 5.0 | 8.0 | 5.0 | — | — | 5.0 | 0.05 | 70.95 | 35.0 |
| C3 | 6.0 | 5.0 | 8.0 | 5.0 | 1.9 | — | 5.0 | 0.6 | 68.5 | 32.8 |
| C4 | 6.0 | 5.0 | 8.0 | 5.0 | 2.0 | — | 5.0 | 0.6 | 68.4 | 32.9 |
| C5 | 6.0 | 5.0 | 8.0 | 5.0 | 3.0 | — | 5.0 | 0.6 | 67.4 | 33.2 |
| C6 | 6.0 | 5.0 | 8.0 | 5.0 | 5.0 | — | 5.0 | 0.6 | 65.4 | 33.9 |
| C7 | 6.0 | 5.0 | 8.0 | 5.0 | 6.0 | — | 5.0 | 0.6 | 64.4 | 34.5 |
| C8 | 6.0 | 5.0 | 8.0 | 5.0 | 7.0 | — | 5.0 | 0.6 | 63.4 | 34.8 |
| C9 | 6.0 | 5.0 | 8.0 | 5.0 | 8.0 | — | 5.0 | 0.6 | 62.4 | 35.4 |

TABLE 2-continued

Composition and surface tension of cyan
inks C1 to C11 (unit: part)

| | Colorant | Organic solvent | | | | | | Ion-exchanged water | Surface tension (mN/m) |
|---|---|---|---|---|---|---|---|---|---|
| | C-a | Gly | EG | 2P | 1,5-PD | DEG | EU | A-EH | | |
| C10 | 6.0 | 5.0 | 8.0 | 5.0 | 8.1 | — | 5.0 | 0.6 | 62.3 | 35.5 |
| C11 | 6.0 | 5.0 | 8.0 | 5.0 | 10.0 | — | 5.0 | 0.6 | 60.4 | 36.2 |

Gly: glycerin
EG: ethylene glycol
2P: 2-pyrrolidone
1,5-PD: 1,5-pentanediol
DEG: diethylene glycol
EU: ethyleneurea
A-EH: acetylenol E 100 (manufactured by Kawaken Fine Chemicals Co., Ltd., ethylene oxide adduct of acetylene glycol)

(Preparation of Yellow Ink)

Prepared was a yellow ink Y1 which has the formulation shown in the following Table 3 and contains the above obtained coloring material (Y-a). At that time, respective components were mixed and the mixture was filtered through a membrane filter having a pore size of 0.2 μm under pressure to obtain yellow ink Y1. Here, the following composition is expressed in "part(s) by mass."

TABLE 3

Composition of Yellow Ink Y1 (unit: part)

| | | Y1 |
|---|---|---|
| Colorant | DY132 | 2.5 |
| | Y-a | 0.5 |
| Organic solvent | Glycerin | 9.0 |
| | Ethylene glycol | — |
| | 2-pyrrolidone | 5.0 |
| | 1,5-pentanediol | — |
| | Diethylene glycol | 9.2 |
| | Ethyleneurea | 5.0 |
| Acetylenol E100[*1] | | 0.9 |
| Ion-exchanged water | | 67.9 |
| Surface tension (mN/m) | | 34.7 |

[*1]manufactured by Kawaken Fine Chemicals Co., Ltd., ethylene oxide adduct of acetylene glycol (Preparation of Magenta Ink)

Prepared was a magenta ink M1 which has the formulation shown in the following Table 4 and contains the above obtained coloring material (M-a). At that time, respective components were mixed and the mixture was filtered through a membrane filter having a pore size of 0.2 μm under pressure to obtain magenta ink M1. Here, the following composition is expressed in "part(s) by mass."

TABLE 4

Composition of magenta ink M1 (unit: part)

| | | M1 |
|---|---|---|
| Colorant | M-a | 6.0 |
| Organic solvent | Glycerin | 4.0 |
| | Ethylene glycol | 9.0 |
| | 2-pyrrolidone | 6.0 |
| | 1,5-pentanediol | — |
| | Diethylene glycol | — |
| | Ethyleneurea | 5.0 |
| Acetylenol E100[*1] | | 1.0 |
| Ion-exchanged water | | 69.0 |
| Surface tension (mN/m) | | 34.1 |

[*1]manufactured by Kawaken Fine Chemicals Co., Ltd., ethylene oxide adduct of acetylene glycol <Combination of Ink for Evaluation and Ink to be used in Combination Therewith>

The above-obtained cyan inks C2 to C11 (inks C4 to C9 were used for examples) and the yellow ink Y1 were combined as shown in Table 5. These inks were used for forming images, and evaluated by the following methods and criteria in terms of beading and reciprocating color uneven.

TABLE 5

Combination of inks used for evaluation test

| | Ink for evaluation Cyan | Ink to be used in combination with ink for evaluation Yellow |
|---|---|---|
| Example 1 | C4 | Y1 |
| Example 2 | C5 | Y1 |
| Example 3 | C6 | Y1 |
| Example 4 | C7 | Y1 |
| Example 5 | C8 | Y1 |
| Example 6 | C9 | Y1 |
| Comparative Example 1 | C2 | Y1 |
| Comparative Example 2 | C3 | Y1 |
| Comparative Example 3 | C10 | Y1 |
| Comparative Example 4 | C11 | Y1 |

<Evaluation of Ink>

An ink tank filled with the above ink was mounted on a modified type of a thermal ink jet printer (trade name: PIXUS 455i, manufactured by Canon Inc.), in which thermal energy was applied to the ink for ejecting ink droplets. Using this printer, the following tests were carried out.

[Test 1: Beading]

Cyan ink and yellow ink were given to a recording medium at 64 levels of duty over the duty range of 0 to 50% for each one, and a green patch (cyan ink: yellow ink=1:1) over the total duty range of 0 to 100% was formed. A recording method used herein was 6-pass bidirectional printing. As a recording medium, an ink jet glossy medium PR101 (manufactured by Canon Inc.) was used. Green patches formed by using ink combinations of Examples 1 to 6 and Comparative Examples 1 to 4 were visually evaluated using as criteria the green patch formed using Y1 ink and C1 ink in the same manner as above. Evaluation results are shown below in Table 6. In the table, the meanings of sings AA, A, B and C are as follows.

AA: beading was reduced compared with the image obtained using Y1 ink and C1 ink A: beading was the same as that of the image obtained using Y1 ink and C1 ink B: slightly more beading occurred than that of the image obtained using Y1 ink and C1 ink C: remarkable beading occurred as compared with the image obtained using Y1 ink and C1 ink

[Test 2: Reciprocating Color Uneven]

Cyan ink and yellow ink were given to a recording medium at 50% duty for each one, and a green solid pattern at the total duty of 100% was formed. A recording method used herein was 1-pass bidirectional printing. As a recording medium, paper commonly used for copies, laser printers and ink jet printers Office Planner (manufactured by Canon Inc.) was used. Regarding ink combinations of Examples 1 to 6 and Comparative Examples 1 to 4, a difference of OD (reciprocating color uneven) between forward printing and backward printing was evaluated based on the image obtained using Y1 ink and C1 ink. Evaluation results are shown below in Table 6. In the table, the meanings of sings AA, A, B and C are as follows.

AA: smaller OD difference compared with the image obtained using Y1 ink and C1 ink A: the same OD difference compared with the image obtained using Y1 ink and C1 ink B: slightly larger OD difference compared with the image obtained using Y1 ink and C1 ink C: larger OD difference compared with the image obtained using Y1 ink and C1 ink

TABLE 6

| | Evaluation results | |
|---|---|---|
| | Test 1 Beading | Test 2 Reciprocating color uneven |
| Example 1 | AA | AA |
| Example 2 | AA | AA |
| Example 3 | AA | AA |
| Example 4 | AA | A |
| Example 5 | AA | A |

TABLE 6-continued

| | Evaluation results | |
|---|---|---|
| | Test 1 Beading | Test 2 Reciprocating color uneven |
| Example 6 | AA | A |
| Comparative Example 1 | C | C |
| Comparative Example 2 | A | B |
| Comparative Example 3 | B | B |
| Comparative Example 4 | B | B |

Next, the above-obtained cyan inks C3 to C5 and C7 to C11 (C4, C5 and C7 to C9 were used for examples) and the magenta ink M1 were combined as shown in Table 7. These inks were used for forming images, and evaluated by the following methods and criteria in terms of beading and reciprocating color uneven.

TABLE 7

| | Combination of inks used for evaluation test | |
|---|---|---|
| | Ink for evaluation Cyan | Ink to be used in combination with ink for evaluation Magenta |
| Example 7 | C4 | M1 |
| Example 8 | C5 | M1 |
| Example 9 | C7 | M1 |
| Example 10 | C8 | M1 |
| Example 11 | C9 | M1 |
| Comparative Example 5 | C3 | M1 |
| Comparative Example 6 | C10 | M1 |
| Comparative Example 7 | C11 | M1 |

[Test 3: Beading]

Cyan ink and magenta ink were given to a recording medium at 64 levels of duty over the duty range of 0 to 50% for each one, and a blue patch (cyan ink: magenta ink=1:1) over the total duty range of 0 to 100% was formed. A recording method used herein was 6-pass bidirectional printing. As a recording medium, an ink jet glossy medium PR101 (manufactured by Canon Inc.) was used. Blue patches formed by using ink combinations of Examples 7 to 11 and Comparative Examples 5 to 7 were visually evaluated while using as criteria the blue patch formed using M1 ink and C1 ink in the same manner as above. Evaluation results are shown below in Table 8. In the table, the meanings of sings AA, A and B are as follows.

AA: beading was reduced compared with the image obtained using M1 ink and C1 ink A: beading was the same as that of the image obtained using M1 ink and C1 ink B: slightly more beading occurred than that of the image obtained using M1 ink and C1 ink

[Test 4: Reciprocating Color Uneven]

Cyan ink and magenta ink were given to a recording medium at 50% duty for each one, and a blue solid pattern at the total duty of 100% was formed. A recording method used herein was 1-pass bidirectional printing. As a recording medium, a copying paper commonly used for copies, laser printers and ink jet printers Office Planner (manufactured by Canon Inc.) was used. Regarding ink combinations of Examples 7 to 11 and Comparative Examples 5 to 7, a difference of OD (reciprocating color uneven) between an image obtained in forward printing and an image obtained in backward printing was evaluated based on the image obtained using M1 ink and C1 ink. Evaluation results are shown below in Table 8. In the table, the meanings of sings AA, A and B are as follows.

AA: smaller OD difference compared with the image obtained using M1 ink and C1 ink A: the same OD difference compared with the image obtained using M1 ink and C1 ink B: slightly larger OD difference compared with the image obtained using M1 ink and C1 ink

TABLE 8

| | Evaluation results | |
|---|---|---|
| | Test 3 Beading | Test 4 Reciprocating color uneven |
| Example 7 | AA | A |
| Example 8 | AA | A |
| Example 9 | AA | A |
| Example 10 | AA | AA |
| Example 11 | AA | A |
| Comparative Example 5 | A | B |
| Comparative Example 6 | B | B |
| Comparative Example 7 | B | B |

In view of the above results, it is obvious that the cyan ink for ink jet and the ink jet recording method using the same according to the present invention offers remarkable effects. Further, similar evaluations were carried out regarding inks containing coloring materials other than those used in the above examples, and yellow and magenta inks having various surface tensions, and remarkable effects of the present invention were obviously obtained in the same manner as above.

The present application claims the benefit of Japanese Patent Application No. 2005-199807, filed on Jul. 8, 2005, of which the content is herein incorporated by reference in its entirety.

What is claimed is:

1. An ink jet recording method comprising:
applying a yellow ink and a cyan ink to a recording medium,
the yellow ink containing, as a coloring material, at least one compound selected from compounds of the following A group and at least one compound selected from compounds of the following B group, and having a surface tension of 33.0 mN/m or more and 36.0 mN/m or less; and
the cyan ink containing, as a coloring material, a phthalocyanine compound represented by the following general formula (1) or (2), containing 1,5-pentanediol as an organic solvent, and having a surface tension of 32.9 mN/m or more and 35.4 mN/m or less;

A group: C.I. Direct Yellow 132 and C.I. Direct Yellow 173

B group: C.I. Direct Yellow 142, C.I. Direct Yellow 86 and a compound represented by the following general formula (3)

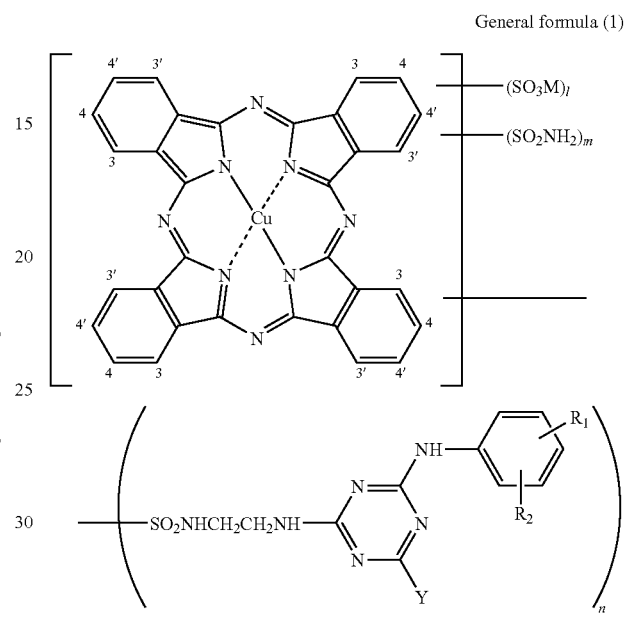

General formula (1)

wherein l represents 0 to 2, m represents 1 to 3, and n represents 1 to 3 provided that l+m+n=3 to 4; a substitution position of a substituent is 4-position or 4'-position; M represents an alkali metal or ammonium; $R_1$ and $R_2$ each independently represent a hydrogen atom, a sulfonic acid group, and a carboxyl group provided that $R_1$ and $R_2$ are not simultaneously a hydrogen atom; Y represents a chlorine atom, a hydroxyl group, an amino group, or a monoalkylamino or dialkylamino group;

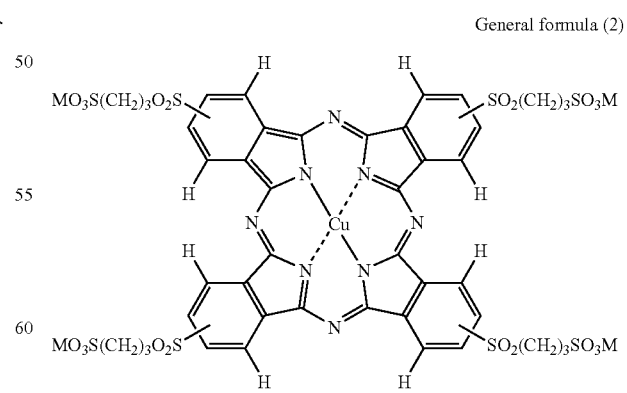

General formula (2)

wherein M is a counter ion of a sulfonic acid group, and represents a hydrogen atom, an alkali metal, ammonium, or organic ammonium;

General formula (3)

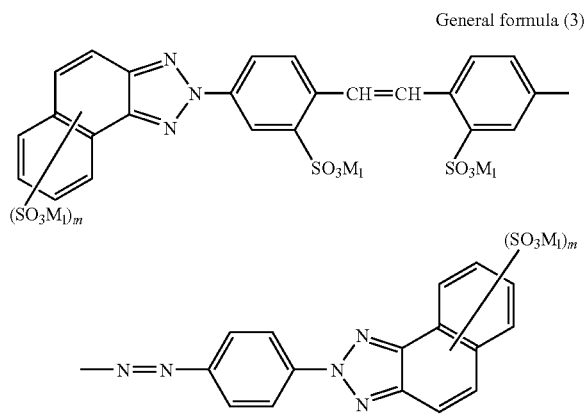

wherein m each independently represents 1 or 2; and M1 represents a hydrogen atom, an alkali metal, an alkali earth metal, a cation of organic amine or an ammonium ion.

2. The ink jet recording method according to claim 1, wherein the content of 1,5-pentanediol is 2.0 mass % or more and 8.0 mass % or less.

3. The ink jet recording method according to claim 1, wherein the contents of the coloring materials in the yellow ink and the cyan ink are 1.0 mass % or more and 10.0 mass % or less.

4. The ink jet recording method according to claim 1, wherein the coloring materials in the yellow ink are C.I. Direct Yellow 132 and a compound represented by the general formula (3), and the coloring material in the cyan ink is a phthalocyanine compound represented by the general formula (1).

5. An ink jet recording method comprising:
applying a magenta ink and a cyan ink to a recording medium,
the magenta ink containing, as a coloring material, an anthrapyridone compound represented by the following general formula (4) or a salt thereof, and having a surface tension of 33.0 mN/m or more and 36.0 mN/m or less; and
the cyan ink containing, as a coloring material, a phthalocyanine compound represented by the following general formula (1) or (2), containing 1,5-pentanediol as an organic solvent, and having a surface tension of 32.9 mN/m or more and 35.4 mN/m or less;

General formula (1)

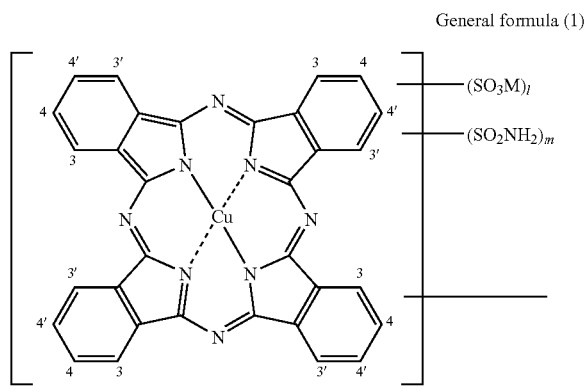

-continued

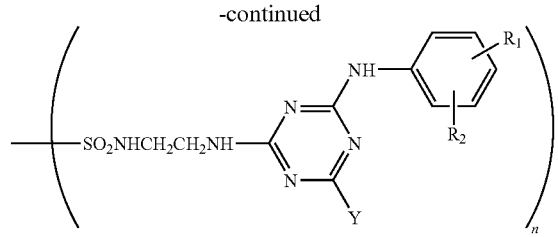

wherein l represents 0 to 2, m represents 1 to 3, and n represents 1 to 3 provided that l+m+n=3 to 4; a substitution position of a substituent is 4-position or 4'-position; M represents an alkali metal or ammonium; $R_1$ and $R_2$ each independently represent a hydrogen atom, a sulfonic acid group, and a carboxyl group provided that $R_1$ and $R_2$ are not simultaneously a hydrogen atom; Y represents a chlorine atom, a hydroxyl group, an amino group, or a monoalkylamino or dialkylamino group;

General formula (2)

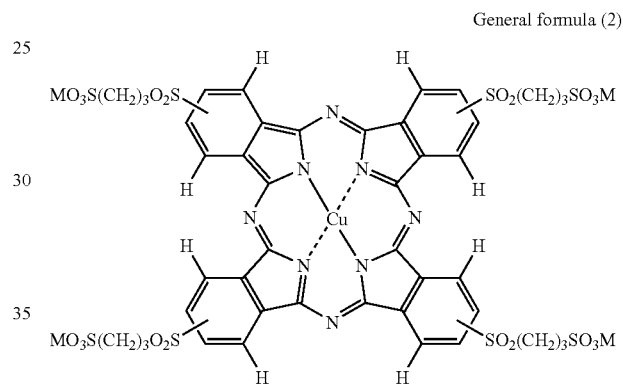

n M is a counter ion of a sulfonic acid group, and represents a hydrogen atom, an alkali metal, ammonium, or organic ammonium;

General Formula (4)

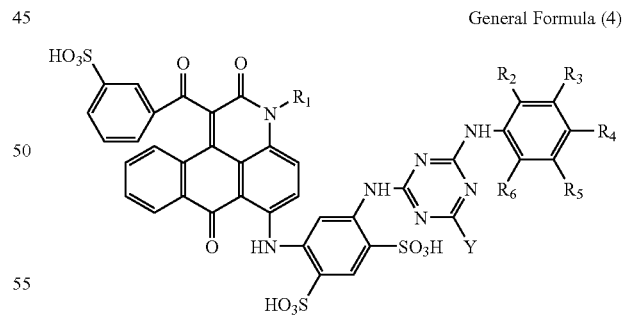

wherein R1 represents a hydrogen atom, an alkyl group, a hydroxyl lower alkyl group, a cyclohexyl group, a mono- or di-alkylaminoalkyl group, and a cyano lower alkyl group; Y represents a chlorine atom, a hydroxyl group, an amino group, or a mono- or di-alkylamino group in which the alkyl moiety may have a substituent selected from the group consisting of a sulfonic acid group, a carboxyl group and hydroxyl group; and $R_2$, $R_3$, $R_4$, $R_5$ and $R_6$ each independently represent a hydrogen atom, an alkyl group having 1 to 8 carbon atoms and a carboxyl group provided that all of $R_2$, $R_3$, $R_4$, $R_5$ and $R_6$ are not simultaneously a hydrogen atom.

6. The ink jet recording method according to claim 5, wherein the content of 1,5-pentanediol is 2.0 mass % or more and 8.0 mass % or less.

7. The ink jet recording method according to claim 5, wherein the contents of the coloring materials in the magenta ink and the cyan ink are 1.0 mass % or more and 10.0 mass % or less.

8. The ink jet recording method according to claim 5, wherein the coloring material in the cyan ink is a phthalocyanine compound represented by the general formula (1).

9. An ink jet recording method comprising:
applying a yellow ink, a magenta ink and a cyan ink to a recording medium,
the yellow ink containing, as a coloring material, at least one compound selected from compounds of the following A group and at least one compound selected from compounds of the following B group, and having a surface tension of 33.0 mN/m or more and 36.0 mN/m or less;
the magenta ink containing, as a coloring material, an anthrapyridone compound represented by the following general formula (4) or a salt thereof, and having a surface tension of 33.0 mN/m or more and 36.0 mN/m or less; and
the cyan ink containing, as a coloring material, a phthalocyanine compound represented by the following general formula (1) or (2), containing 1,5-pentanediol as an organic solvent, and having a surface tension of 32.9 mN/m or more and 35.4 mN/m or less;
A group: C.I. Direct Yellow 132 and C.I. Direct Yellow 173
B group: C.I. Direct Yellow 142, C.I. Direct Yellow 86 and a compound represented by the following general formula (3)

represent a hydrogen atom, a sulfonic acid group, and a carboxyl group provided that $R_1$ and $R_2$ are not simultaneously a hydrogen atom; Y represents a chlorine atom, a hydroxyl group, an amino group, or a monoalkylamino or dialkylamino group;

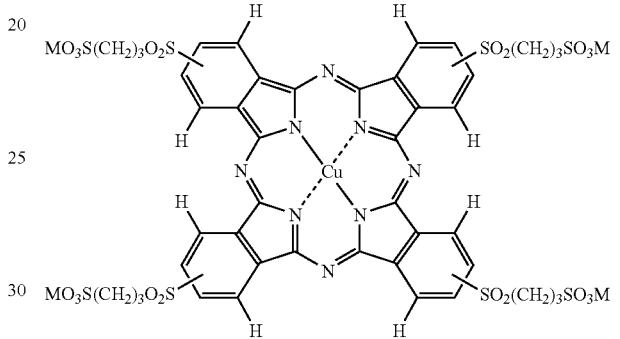

General Formula (2)

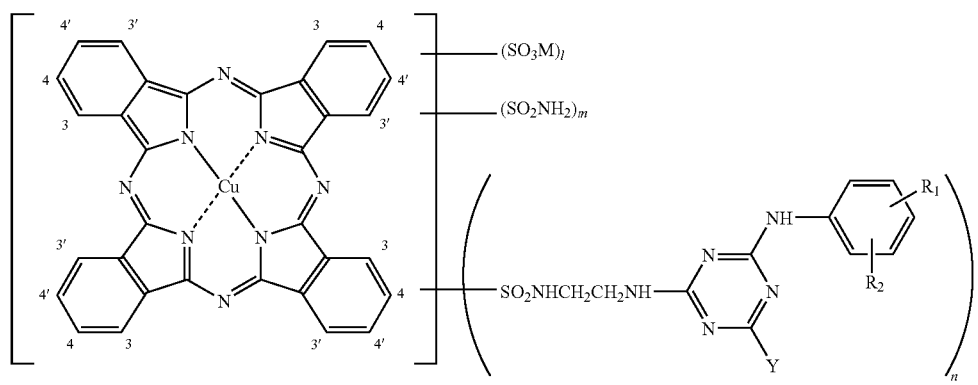

General Formula (1)

wherein l represents 0 to 2, m represents 1 to 3, and n represents 1 to 3 provided that l+m+n=3 to 4; a substitution position of a substituent is 4-position or 4'-position; M represents an alkali metal or ammonium; $R_1$ and $R_2$ each independently wherein M is a counter ion of a sulfonic acid group, and represents a hydrogen atom, an alkali metal, ammonium, or organic ammonium;

General Formula (3)

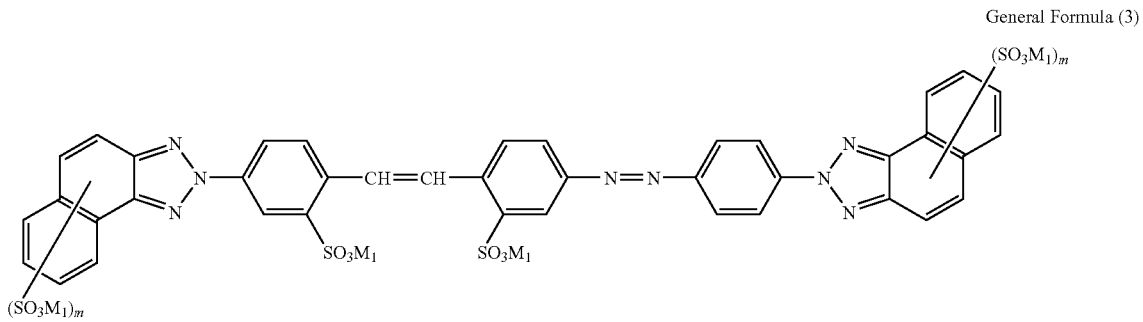

wherein m each independently represents 1 or 2; and M1 represents a hydrogen atom, an alkali metal, an alkali earth metal, a cation of organic amine or an ammonium ion;

General Formula (4)

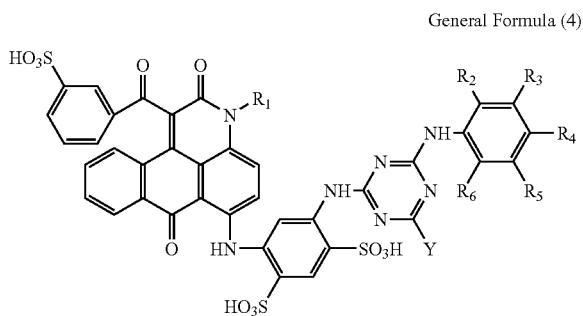

wherein $R_1$ represents a hydrogen atom, an alkyl group, a hydroxyl lower alkyl group, a cyclohexyl group, a mono- or di-alkylaminoalkyl group, and a cyano lower alkyl group; Y represents a chlorine atom, a hydroxyl group, an amino group, or a mono- or di-alkylamino group in which the alkyl moiety may have a substituent selected from the group consisting of a sulfonic acid group, a carboxyl group and hydroxyl group; and $R_2$, $R_3$, $R_4$, $R_5$ and $R_6$ each independently represent a hydrogen atom, an alkyl group having 1 to 8 carbon atoms and carboxyl group provided that all of $R_2$, $R_3$, $R_4$, $R_5$ and $R_6$ are not simultaneously a hydrogen atom.

10. A cyan ink for ink jet, as set out in the ink jet recording method of claim 1.

11. A cyan ink for ink jet, as set out in the ink jet recording method of claim 5.

12. A cyan ink for ink jet, as set out in the ink jet recording method of claim 9.

13. The ink jet recording method according to claim 1, wherein the yellow ink and the cyan ink are applied to the recording medium bi-directionally.

14. The ink jet recording method according to claim 5, wherein the magenta ink and the cyan ink are applied to the recording medium bi-directionally.

15. The ink jet recording method according to claim 9, wherein the yellow ink, the magenta ink and the cyan ink are applied to the recording medium bi-directionally.

* * * * *